(12) United States Patent
Sarukkai et al.

(10) Patent No.: US 7,716,219 B2
(45) Date of Patent: May 11, 2010

(54) DATABASE SEARCH SYSTEM AND METHOD OF DETERMINING A VALUE OF A KEYWORD IN A SEARCH

(75) Inventors: Ramesh R. Sarukkai, Union City, CA (US); Qi Lu, Saratoga, CA (US)

(73) Assignee: Yahoo ! Inc., Sunnyvale, CA (US)

( * ) Notice: Subject to any disclaimer, the term of this patent is extended or adjusted under 35 U.S.C. 154(b) by 136 days.

(21) Appl. No.: 10/887,457

(22) Filed: Jul. 8, 2004

(65) Prior Publication Data

US 2006/0010105 A1 Jan. 12, 2006

(51) Int. Cl.
*G06F 17/30* (2006.01)
*G06F 17/00* (2006.01)

(52) U.S. Cl. ............... 707/735; 707/944; 706/17

(58) Field of Classification Search .......... 707/3; 705/37

See application file for complete search history.

(56) References Cited

U.S. PATENT DOCUMENTS

| | | | | |
|---|---|---|---|---|
| 5,467,425 A | * | 11/1995 | Lau et al. ............... | 704/243 |
| 6,243,691 B1 | | 6/2001 | Fisher et al. ............ | 705/37 |
| 6,269,361 B1 | | 7/2001 | Davis et al. ............. | 707/3 |
| 6,327,574 B1 | * | 12/2001 | Kramer et al. ........... | 705/14 |
| 2002/0107853 A1 | * | 8/2002 | Hofmann et al. ......... | 707/7 |
| 2002/0161673 A1 | | 10/2002 | Lee et al. ............... | 705/27 |
| 2003/0033292 A1 | * | 2/2003 | Meisel et al. ........... | 707/3 |
| 2003/0046389 A1 | | 3/2003 | Thieme .................. | 707/224 |
| 2003/0088525 A1 | | 5/2003 | Velez et al. ............. | 705/400 |
| 2003/0220918 A1 | | 11/2003 | Roy et al. ............... | 707/3 |
| 2004/0039733 A1 | | 2/2004 | Soulanille .............. | 707/3 |
| 2004/0044571 A1 | | 3/2004 | Bronnimann et al. ...... | 705/14 |
| 2004/0088241 A1 | * | 5/2004 | Rebane et al. ........... | 705/37 |
| 2004/0107137 A1 | | 6/2004 | Skinner ................. | 705/14 |

OTHER PUBLICATIONS

International Search Report from corresponding PCT application No. PCT/US05/24148, dated Jan. 6, 2006, 9 pages.
"Measuring Search Engine Return on Investment (ROI)", article dated Jul. 14, 2003, printed from the internet at http://www.rankforsales.com/n-ac/131-seo-jul-14-03.html on Oct. 13, 2005, 2 pages.
Laura Thieme-"Tracking and Measuring Search Engine Marketing Success", article dated Jun. 18, 2002, printed from the internet at http://searchenginewatch.com/searchday/article.php/2160151 on Oct. 13, 2005, 5 pages.
International Preliminary Report on Patentability from International Application No. PCT/US2005/024148, mailed Jan. 18, 2007, 5 pages.

* cited by examiner

*Primary Examiner*—Tony Mahmoudi
*Assistant Examiner*—Michele C Choi
(74) *Attorney, Agent, or Firm*—Brinks Hofer Gilson & Lione (57) ABSTRACT

Methods of determining values of keywords in an internet search are described. According to one aspect of the invention, a method comprises steps of receiving keywords entered for a plurality of searches; detecting converted transactions associated with the plurality of searches; analyzing the converted transactions; and determining values associated with the keywords based upon the converted transactions. According to other aspects of the invention, methods for recommending subsets of keywords and for recommending keywords based upon converted transactions and click through rates are disclosed. A database search system is also disclosed.

23 Claims, 6 Drawing Sheets

| Keyword | P(k,s\|T) | Ave. $$ per Order |
|---|---|---|
| Store Brand 1 | 0.0322709 | $71.86 |
| Vitamin Band B | 0.0132266 | $30.98 |
| Online Vitamins | 0.0110387 | $63.77 |
| Vitamins | 0.0102432 | $51.87 |
| Tea | 0.00676247 | $30.12 |
| Vitamin Brand T | 0.00586744 | $56.12 |
| Rx | 0.00586744 | $44.64 |
| Stamina | 0.00586744 | $42.40 |
| Vitamin Brand X | 0.00561882 | $55.12 |

FIG. 4

| Keyword | $-\mathrm{Log}(P_{\mathrm{Norm, ROI}}(k, s\ T))$ |
|---|---|
| Store Brand 1 | 3.05 |
| Online Vitamins | 4.24 |
| Vitamins | 4.53 |
| Vitamin Brand L | 4.64 |
| Vitamin Brand B | 4.79 |
| Vitamin Brand T | 5.00 |
| Vitamin Brand A | 5.02 |
| Vitamin Brand F | 5.02 |
| Vitamin Brand X | 5.07 |

FIG. 5

| Paid Listing Keyword Set | Entropy |
|---|---|
| { Store Brand 1} | 0.144 |
| {vitamins, Vitamin Brand B} | 0.094 |
| {Vitamin Brand B, Vitamin Brand T} | 0.074 |
| {Vitamin Brand T, Vitamin Brand F} | 0.066 |

DATABASE SEARCH SYSTEM AND METHOD OF DETERMINING A VALUE OF A KEYWORD IN A SEARCH

FIELD OF THE INVENTION

The present invention relates generally to database searching, and in particular, to a database search system and a method of determining a value of a keyword or set of keywords in a database search.

BACKGROUND OF THE INVENTION

Generally, in a web-based search on an Internet search engine, a user enters a search term comprising one or more keywords, which the search engine then uses to generate a search result list comprising of web pages that the user may access via a hyperlink. There are many ways in which a search engine can return the results list. There are search engines that use automated search technology, which relies in large part on complex, mathematics-based database search algorithms that select and rank web pages based on multiple criteria such as keyword density and keyword location. The search results generated by such mechanisms often rely on blind mathematical formulas and may be random and even irrelevant. These search engines often catalog search results that rely on invisible web site descriptions, or "meta tags", that are authored by web site promoters. It is not uncommon for web site owners to tag their sites as they choose in attempt to attract additional consumer attention at little to no marginal cost and no guarantee that the website's content is actually relevant to the meta tags used on its site.

Internet advertising can offer a level of targetability, interactivity, and measurability not generally available in other media. With the proper tools, Internet advertisers have the ability to direct and target their messages to specific groups of consumers and receive prompt feedback as to the effectiveness of their advertising campaigns such as the services offered by commercial search engine providers such as Overture (overture.com). Many of the traditional paradigms of advertising and search engine algorithms fail to offer appropriate options to businesses or advertisers or to maximize the delivery of relevant information via the web to interested parties in a cost-effective manner for those businesses and advertisers. Ideally, web site promoters or advertisers should be able to control their placement in search result listings so that their listings appear in searches that are relevant to the content of their web site and to control their mode of participation and any associated costs so that such listings are desirable or effective for their marketing objectives in using a commercial search engine. Search engine functionality needs to facilitate an online marketplace which offers consumers quick, easy and relevant search results while providing Internet advertisers and promoters with a cost-effective way to target consumers in a manner they determine most appropriate for their business goals. In this online marketplace, companies selling products, services, or information will be able to determine the options that best suit its advertising and cost needs and appear in desirable positions on a search result list generated by an Internet search engine.

Since advertisers generally must pay for each referral generated through the search result lists generated by the search engine, advertisers have an incentive to select and bid on those search keywords that are most relevant to their web site offerings and are most likely to achieve their marketing goals, e.g. inducing searchers to purchase the advertisers products or services.

A referral can be of any one of a number of types. One type of referral is an impression referral, whereby the advertiser's listing appears in the search results list. Another type of referral is a click-through referral, whereby a consumer clicks on the advertiser's listing. Still another type of referral is an action referral, whereby after the consumer has clicked on the advertiser's listing, the consumer takes further action in connection with the advertiser's web site. These further actions include, for example, actions such as registering with the advertiser's site, participating in a promotion in connection with the advertiser's site, and/or purchasing a good or service from the advertiser. Advertisers can bid on one or more of the various types of referrals. In the case where the advertiser bids on more than one type of referral, a bid will comprise multiple elements, one element per type of referral bid upon. The higher the market value of an advertiser's bid, the higher the advertiser's position on a search result list. The higher an advertiser's position on a search result list, the higher the likelihood of a referral; that is, the higher the likelihood that a consumer will be referred to the advertiser's web site through the search result list by clicking on the result in that position on the page.

The advertiser influences a position for a search listing in the advertiser's account by first selecting a search term relevant to the content of the web site or other information source to be listed. The advertiser enters the search term and the description into a search listing. The advertiser influences the position for a search listing through a continuous online competitive bidding process. The bidding process occurs when the advertiser enters a new bid amount, which is preferably a money amount, for a search listing. The commercial search engine then compares this bid amount with all other bid amounts for the same search term, and generates a rank value for all search listings having that search term. The rank value generated by the bidding process determines where the advertiser's listing will appear on the search results list page that is generated in response to a query of the search term by a searcher or user on the computer network. A higher bid by an advertiser will usually result in a higher rank value and a more advantageous placement although other factors besides bids may also be considered in ranking the search results.

Thus, when a user performs a search on such a search engine, the results are conventionally sorted based on how much each advertiser has bid on the user's search term. Because different users will use different words to find the same information, it is important for an advertiser to bid on a wide variety of search terms in order to maximize the traffic to his site. The better and more extensive an advertiser's list of search terms, the more traffic the advertiser can generate for their website. In cases where the advertiser is able to track relative keyword performance for directing traffic to their website.

However, selecting search terms by an advertiser can be a challenge. Good search terms have three significant properties: they are relevant to the advertiser's site content, they are popular enough that many users are likely to search on them, and they provide good value in terms of the expected return from the traffic they send to the advertiser's website. An advertiser willing to take the time to consider all these factors may get good results. Selecting successful bidding strategies using conventional tools can also be unpredictable because such conventional tools do not take converted transactions into account and cannot aggregate price change data over time. Not only do values of search keywords change over time, conventional tools for helping select a bidding strategy fail to make recommendations for a search based upon converted transactions or other individual advertiser objectives influenced by time.

Accordingly, there is a need for an improved database search system and method of determining a value of a keyword in a search over time.

SUMMARY OF THE INVENTION

Methods of determining values of keywords in an internet search are described. According to one aspect of the invention, a method comprises steps of receiving keywords entered for a plurality of searches; detecting converted transactions associated with the plurality of searches; analyzing the converted transactions; and determining values associated with the keywords based upon the converted transactions. According to other aspects of the invention, methods for recommending subsets of keywords and for recommending keywords based upon converted transactions and click through rates are disclosed.

A database search system is also disclosed. The database search system preferably comprises a storage element storing information related to converted transactions for the purchase of goods online by way of the data search system; a processing system coupled to the storage element, the processing system generating recommendations for selecting keywords for advertisers associated with the database based upon the converted transactions; and a graphical user interface coupled to the processing system, the user interface enabling advertisers to access the recommendations for selecting keywords. According to other aspects of the invention, advertiser web servers and client devices are also disclosed.

DETAILED DESCRIPTION OF THE DRAWINGS

Figure 1:
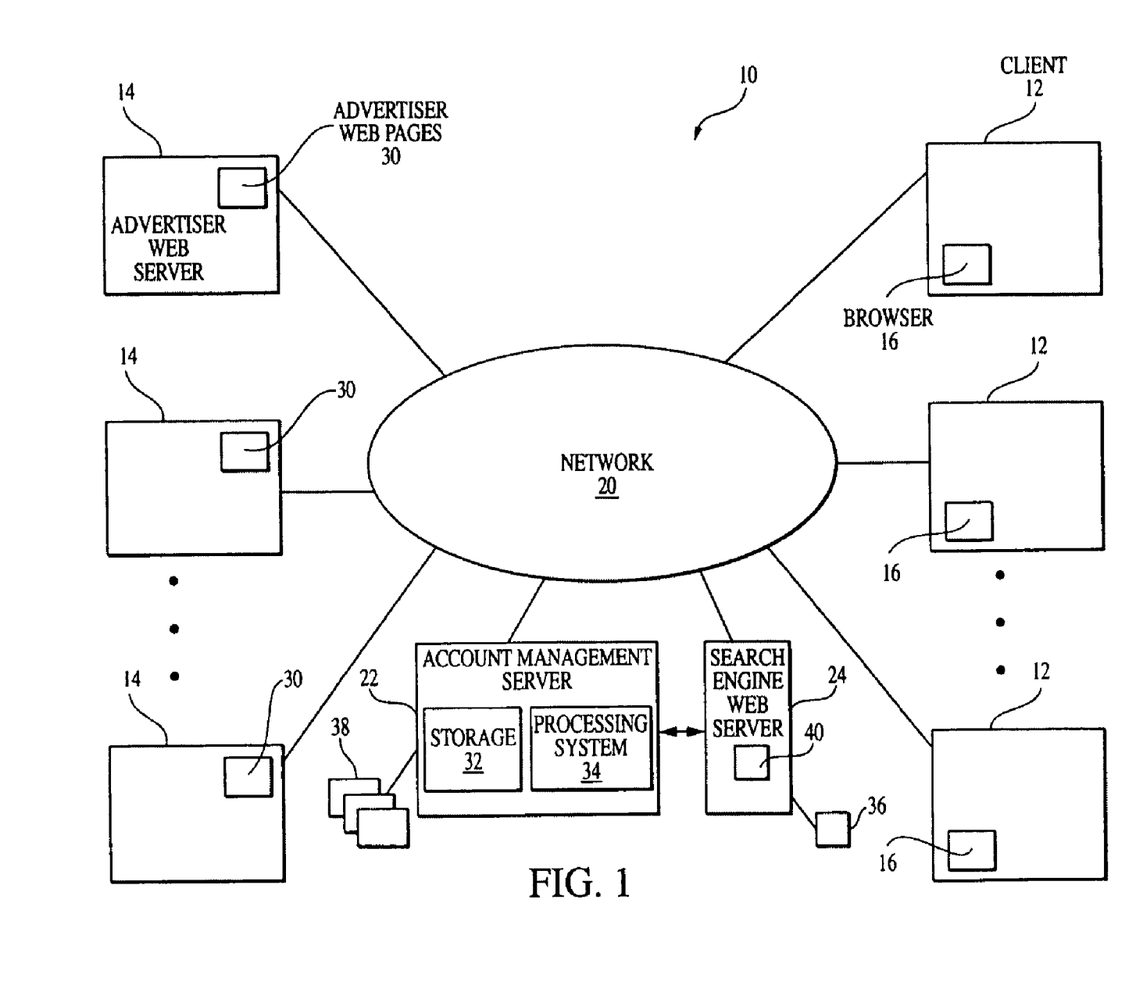
FIG. 1 is a system for enabling a database search according to the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as a conventional browser program well known in the art, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, client computers 12 communicate through the network 20 with various network information providers, including account management server 22, search engine server 24, and advertiser servers 14 using the functionality provided by a HyperText Transfer Protocol (HTTP), although other communications protocols, such as FTP, SNMP, TELNET, and a number of other protocols known in the art, may be used. Preferably, search engine server 24, account management server 22, and advertiser servers 14 are located on the World Wide Web.

As discussed above, at least two types of server are contemplated in a preferred embodiment of the present invention. The first server contemplated is an account management server 22 comprising a computer storage medium 32 and a processing system 34. A database 38 is stored on the storage medium 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server transmits this list, in the form of a web page, to the network user, where it is displayed on the browser 16 running on the client computer 12. A presently preferred embodiment of the search engine web server may be found by navigating to the web page at URL goto.com. In addition, the search result list web page, an example of which is presented in FIG. 7, will be discussed below in further detail.

Search engine web server 24 is connected to the Internet 20. In a preferred embodiment of the present invention, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at client computers 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processor 34 of account management server 22, where the computer program will evaluate the search term and corresponding web site according to a set of predefined editorial rules.

The higher bids receive more advantageous placement on the search result list page generated by the search engine 24 when a search using the search term bid on by the advertiser is executed. In a preferred embodiment of the present invention, the amount bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages 30 located on advertiser web servers 14. In a preferred embodiment of the present invention, the search result list also includes non-paid listings that are not placed as a result of advertiser bids and are generated by a conventional World Wide Web search engine. The non-paid hypertext links may also include links manually indexed into the database 40 by an editorial team. Most preferably, the non-paid listings follow the paid advertiser listings on the search results page.

Figure 2:
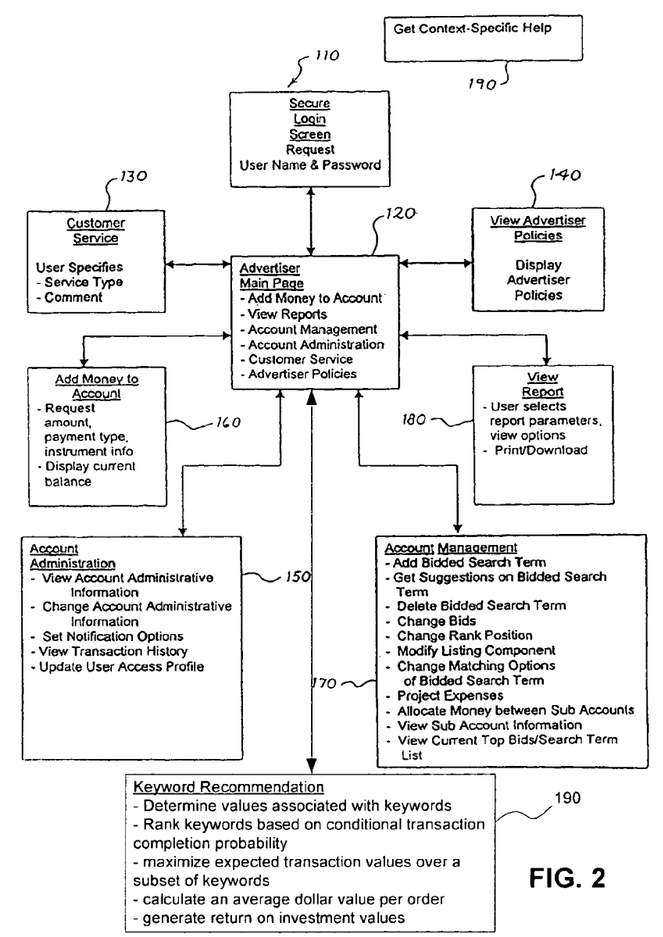
FIG. 2 is a block diagram of a system for enabling advertisers to manage an account associated with database searching according to the present invention.

Turning now to FIG. 2, a diagram shows menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 on a graphical user interface that has a number of options and further services for advertisers. These items, which will be discussed in more detail below, cause routines to be invoked to either implement the advertiser's request or request further information prior to implementing the advertiser's request. In one embodiment of the present invention, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options. Finally, keyword recommendations 195 also preferably provide beneficial information to advertisers. As will be described in more detail in reference to the remaining figures, the systems and methods of the present invention determine values associated with keywords, and rank the keywords based on transaction completion probability. Such a ranking enables maximizing transaction values over a subset of keywords. The systems and methods also preferably calculate average dollar values per order and generate return on investment values.

Figure 3:
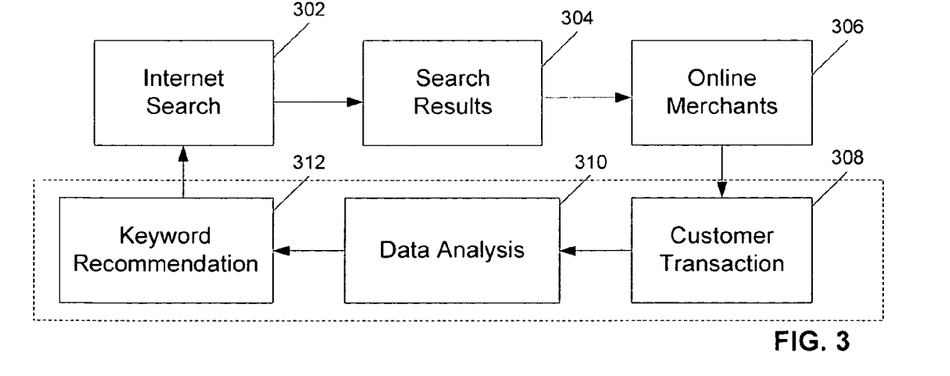
FIG. 3 is a timing diagram showing the steps in generating a keyword recommendation according to the present invention.

Turning now to FIG. 3, a timing diagram shows the steps in generating a keyword recommendation according to the present invention. An important goal of sponsored search is to get key placements on search/paid listing sites, and drive traffic to those sponsored sites. According to one aspect of the invention, an end-to-end solution not only drives traffic to websites, but also provides a higher degree of confidence for advertisers that such traffic to websites will lead to converted transactions. A converted transaction could include an actual purchase by a user, or could also include any event completion, such as insertion of item into a shopping cart, or linking off to an (internal or external) site. As will be set forth in more detail below, probabilistic models for estimating and determining how various keywords translate to order placement dollar amounts is described. An important aspect of this analysis is the approach of utilizing end-to-end information for determining associations of search keywords to completed e-commerce transactions, and the ability to recommend which sponsored keywords can be favorable from a transaction perspective.

Such recommendations for keywords not only maximizes advertising revenue, but also potentially increases revenue generated by a search engine provider through the sales of goods by providing end-to-end solutions to customers. In particular, a user searching the internet using a search engine based upon some keywords will get a list of inside listings related to the provider of the search engine, paid search results, and normal search results. With millions of users receiving search results by accessing a search engine, there is a tremendous opportunity to funnel these users to other areas controlled by the provider of the search engine. Perhaps more importantly, these possibly "window-information-shopping" customers can be converted into paid customers by identifying and driving them to compelling products/services that are of interest and value to them.

Small Business services are one such compelling service area that provide a variety of substantial services for small business users and the customers of these small business users. FIG. 3 illustrates the end-to-end approach of a search as a funnel into the network for small business e-commerce transactions. Keywords entered on an internet search 302 get potential customers into the network by generating search results 304. These search results can lead a user to online merchants 306 affiliated with the provider of the search engine. Customers make a transaction 308 which translates to revenue for a merchant as well as the provider of the search engine. Data analysis 310 associated with the transaction is then generated to provide estimates of the value for each keyword, as will be described in more detail below. Finally, a keyword recommendation 312 can be generated by the provider of the search engine to an advertiser to allow the advertiser to select the best keywords for a given budget.

According to one aspect of the invention, the translation of keywords that actually generate e-commerce transactions, rather than just based on many searches that lead to a site/store affiliated with the provider of the search engine, provides more relevant information. Thus, the tool of the present invention is a more robust end-to-end model for recommending keywords for sponsored search listings. As will be described in more detail below, the keyword recommendations are preferably periodically or continuously run to provide current or updated values associated with keywords. Of course, this iterative process can be boostrapped with normal search keywords that send customers to the sites affiliated with the provider of the search engine. This information can be integrated with other properties such as influencing ranking of the site in shopping listing.

Figure 4:
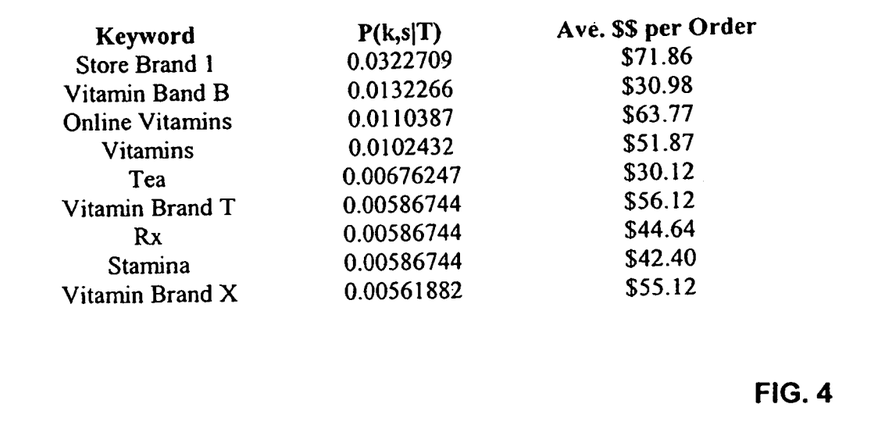
FIG. 4 is a table showing a probability of a sale and an average dollar per order for a given keyword according to the present invention.

Turning now to FIG. 4, a table shows a probability of a sale and an average dollar per order for a given keyword according to the present invention. In order to generate a keyword recommendation based upon converted transactions, the probability that some transaction "T" is completed on a particular store or site "S" when a user searches with keyword "k" must be determined. The probability could be defined to be: P(T|k,S). This probability can be estimated using Bayes' rule:

$$P(T \mid k, S) = \frac{P(k, S \mid T) * P(T)}{P(k, S)}$$

The conditional probability P(k,S|T) can be computed using the e-commerce transaction completion data reflecting the occurrences of keyword "k" with purchases of any items in store site "S". Here the P(T) can be estimated using the general transaction probability. P(k,S) is estimated to be the unigram keyword probability. An Expected Transaction Value (i.e. average dollar value per order) can be computed as follows:

$$E(T \mid k, S) = P(T \mid k, S) * \frac{\sum_{\forall t} R(t \mid k, S)}{C(t \mid k, S)},$$

where C(t|k,S) is a non-zero value. Here R(t) is the transaction value of order "t", and C(t) may be a count of the number of orders "t". As shown in FIG. 4, an example of the probability of a converted transaction and an average dollar per order for particular keywords is shown. A few of the top probabilistic keywords are listed in the table above. It should be noted that there is a variance in the average dollar amount per order. This information can be further used to compute the ROI based ranking of the search keywords. Expected number of transactions for a given keyword times the expected transaction value for a given keyword will estimate the ROI for listing that keyword.

Figure 5:
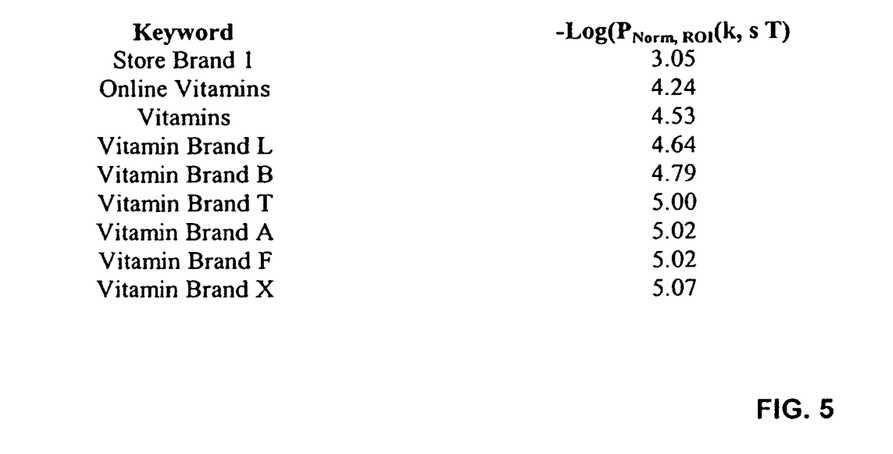
FIG. 5 is a table showing normalized values of probabilities for keywords according to the present invention.

Turning now to FIG. 5, a table shows normalized values of probabilities for keywords according to the present invention. In particular, the table below shows the normalized ROI probability (-Logarithm), and lists the top 10 keywords. It should be noted that the high dollar orders move up in positions over the lower revenue generating orders. Also, some simplifying assumptions, such as an assumption that a return on an order is proportional to the cost of the order, can be been made.

Figure 6:
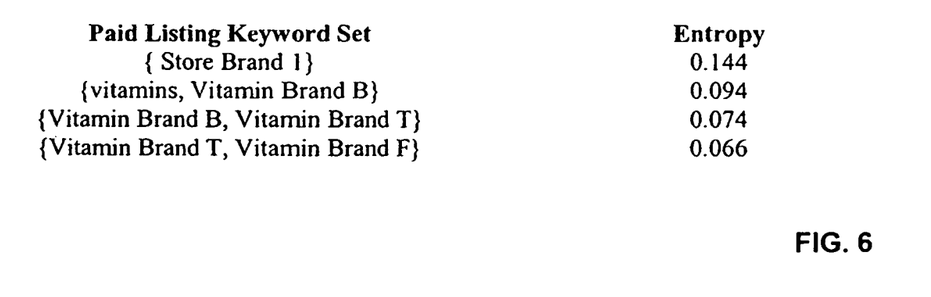
FIG. 6 is a table showing an entropy value for keyword sets according to the present invention.

Turning now to FIG. 6, a table shows an entropy value for keyword sets according to the present invention. Based on the entropy measure (i.e. a value of keyword or combination of keywords for a given budget), keywords can be picked with the highest entropy depending on the placement slot cost for each keyword. The keywords can be ranked based on the conditional transaction completion probability to maximize return on investment (ROI). In order to select a subset of keywords for maximum ROI, certain constraints can be applied. For example, the total cost of keywords is less than the maximum constrained budget, and the return for given keywords is maximized (i.e. Maximize(E(T|K,S))) over subset of keywords K. At each step of the iteration, different set lengths can be chosen. Furthermore, at each replacement step, the keyword replacement is retained if the transaction return value is greater than without the keyword replacement.

Many methods of computing subsets of keywords that maximize ROI can be used. In the algorithm listed below, we compute the Expected return on a transaction based on a keyword, or a set of keywords, and iterate over subsets and retain the subsets with a maximum entropy value.

Entropy of a set of keywords $\{t_1, t_2, t_3 \ldots\}$ is defined as $$\text{Entropy}(t1, t2, t3 \ldots) = -\sum_{\forall t} E(t \mid k, S) * \log(E(t \mid k, S))$$

1. Define the maximum keyword list length, entropy threshold, and maximum recommendation list length.
2. Pick top ROI keywords for computing recommendation word sets.
3. Iterate over the number of keywords to be chosen
4. For each subset with this cardinality, compute the total cost of sponsored listing of that keyword subset (sum of individual keyword sponsored listing costs for all keywords in that subset). If less than the available budget goto next step, else iterate over next subset of keywords.
5. For this subset of keywords compute the entropy of that keyword set.
6. If the computed entropy is more than the entropy of any existing set in the recommendation list, then insert into the list.
7. Iterate over next keyword subset.
8. The final list of keyword lists on the recommendation list is the desired output.

Referring to the example in the table of FIG. 6, assuming that "Storebrand 1" and "Online Vitamins" have placement costs of say $100 and the rest have placement costs of say $50. Applying the maximum entropy algorithm, we have the following ordering of keyword sets, based on a budget constraint of $100. It should be noted that beyond "Storebrand 1" in this example, other keyword sets (with the pricing constraint) had higher entropy for other keyword pairs. Furthermore, the keywords "Storebrand 1" and "Online Vitamins" are also already listed in the paid sponsor listings, therefore providing a very dynamic and integrated mechanism.

Figure 7:
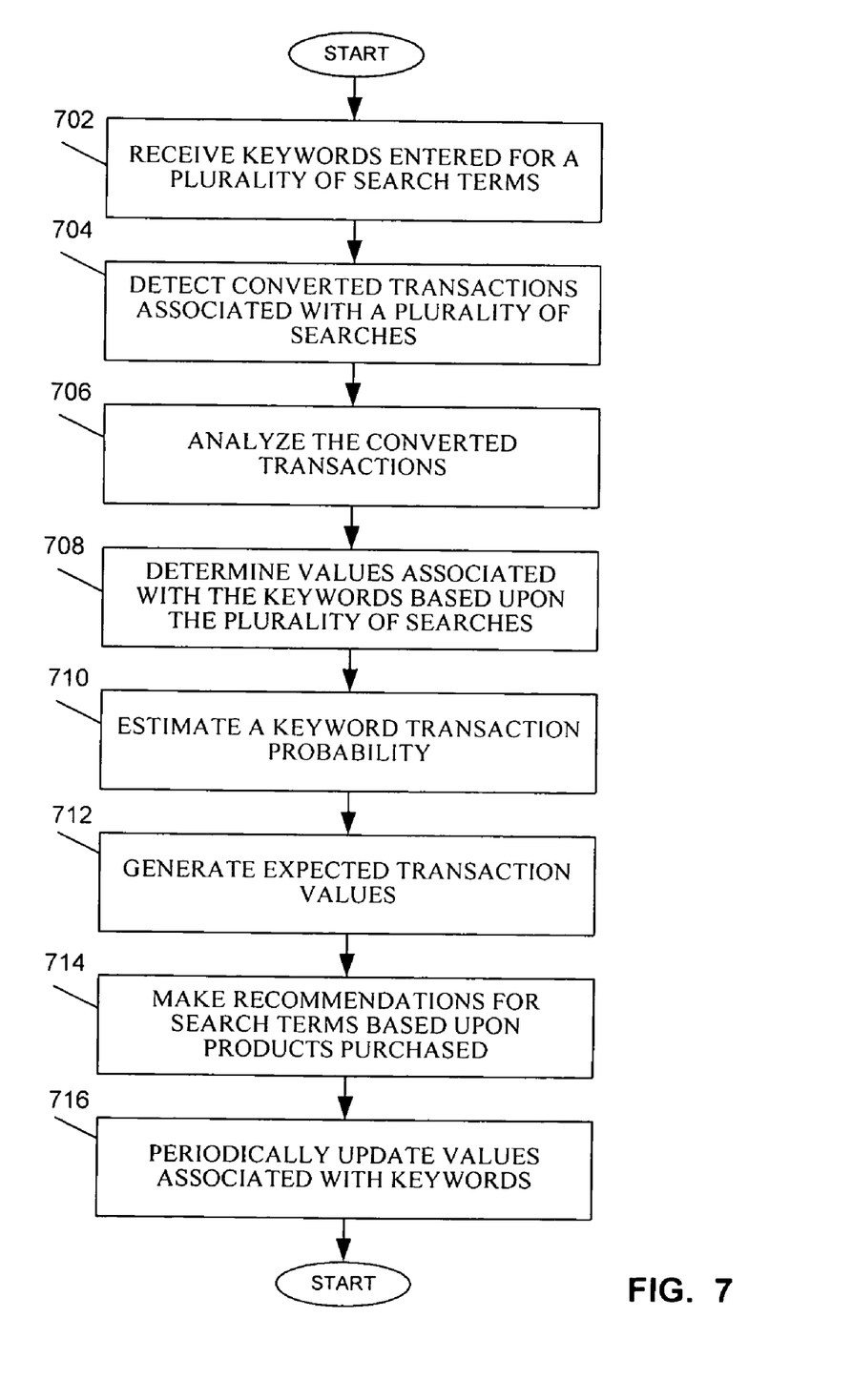
FIG. 7 is a flowchart showing a method of recommending search terms based upon converted transactions according to the present invention.

Turning now to FIG. 7, a flowchart shows a method of recommending search terms based upon converted transactions according to the present invention. In particular, keywords entered for a plurality of search terms are received at a step 702. Converted transactions associated with the plurality of searches are then detected at a step 704. The converted transactions are then analyzed at a step 706. Values associated with the keywords based upon a plurality of searches are determined at a step 708. A keyword transaction probability is then estimated at a step 710, and expected transaction values are generated at a step 712. Recommendations for search terms are then made based upon products purchased at a step 714. Finally, values associated with keywords are periodically updated at a step 716.

Figure 8:
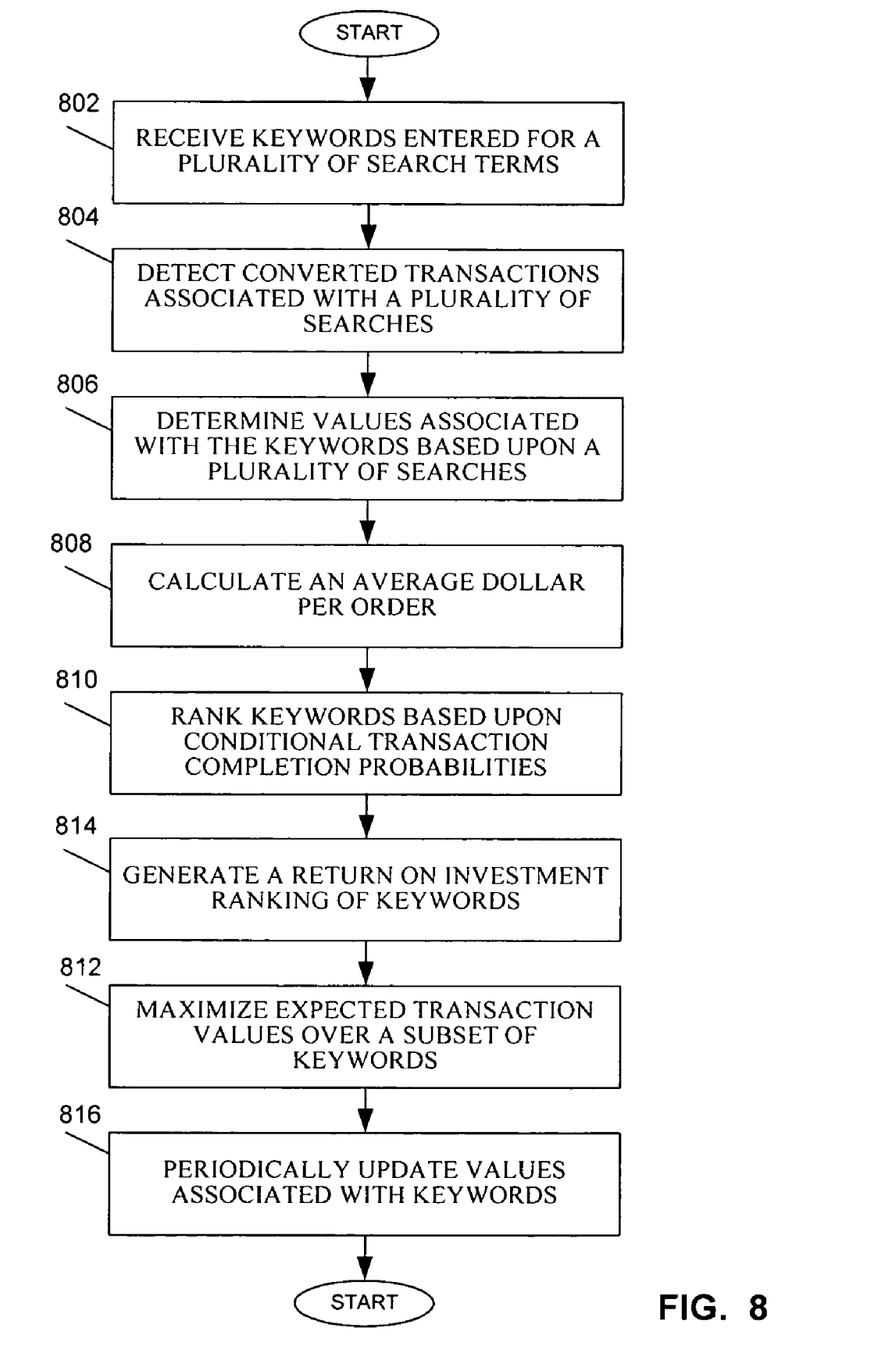
FIG. 8 is a flowchart showing a method of recommending subsets of keywords according to the present invention.

Turning now to FIG. 8, a flowchart shows a method of recommending subsets of keywords according to the present invention. In particular, keywords entered for a plurality of search terms are received at a step 802. Converted transactions associated with the plurality of searches are then detected at a step 804. Values associated with the keywords based upon a plurality of searches are determined at a step 806. An average dollar per order is then calculated at step 808. The keywords are then ranked based upon conditional transaction completion probabilities at a step 810. A return on investment ranking of keywords is generated at a step 812. An expected transaction values over a subset of keywords is maximized at a step 814. Finally, the values associated with the keywords are periodically updated at a step 816.

Figure 9:
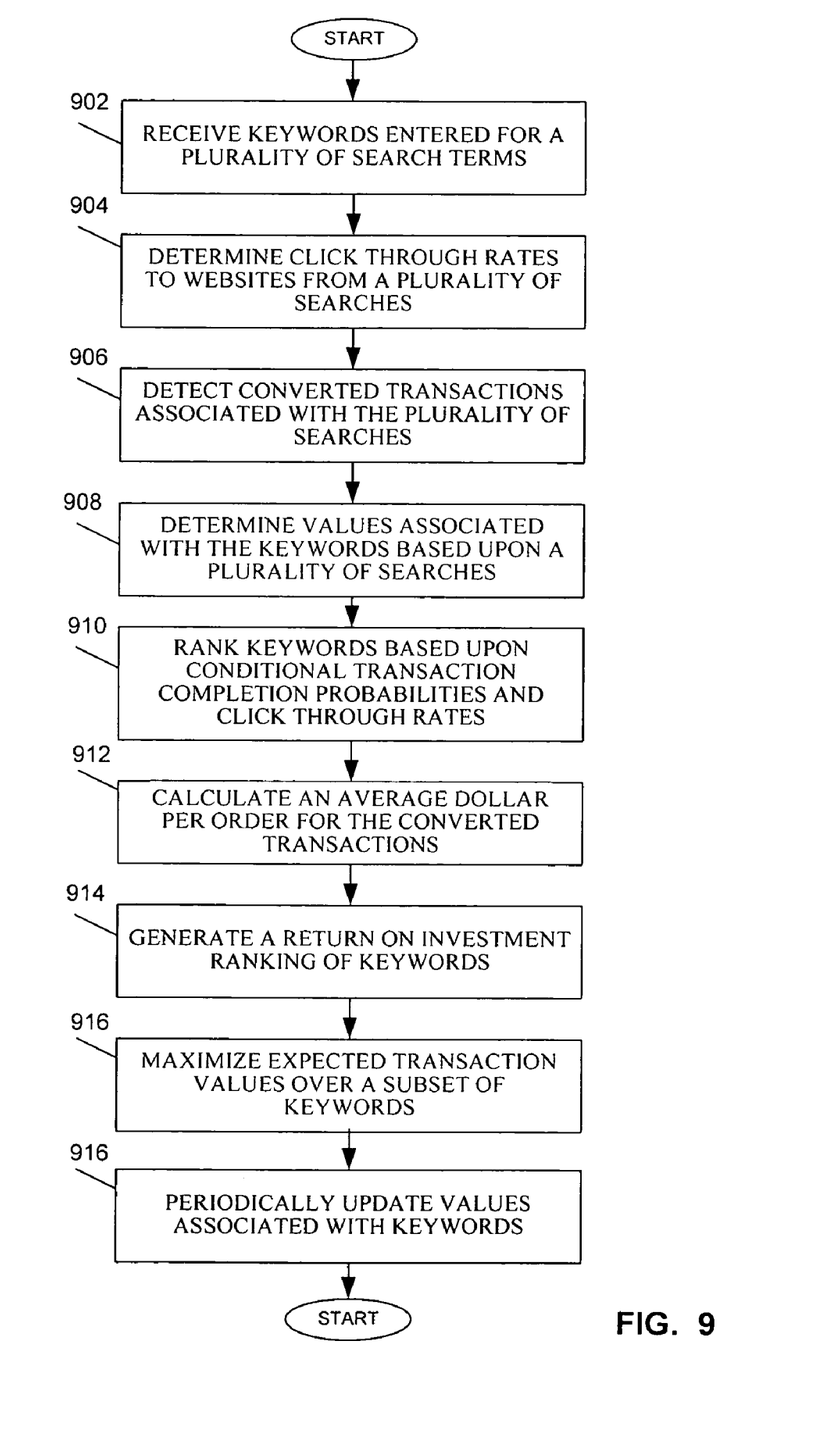
FIG. 9 is a flowchart showing a method of recommending search terms based upon transaction completion probabilities and click through rates according to the present invention.

Turning now to FIG. 9, a flowchart shows a method of recommending search terms based upon transaction completion probabilities and click through rates according to the present invention. In particular, keywords entered for a plurality of search terms are received a step 902. Click through rates of websites from the search results are determined at a step 904. Converted transactions associated with the plurality of searches are detected at a step 906. Values associated with the keywords based upon a plurality of searches are determined at a step 908. Keywords are then ranked based upon transaction completion probability and click through rates at a step 910. An average dollar per order is then calculated at a step 912. A return on investment ranking of keywords is generated at a step 914. Expected transaction values are maximized over a subset of keywords at a step 916. Finally, the values associated with the keywords are periodically updated at a step 918.

In this summary, an end-to-end approach to sponsored search recommendations is described. Accordingly, the system and method of the present invention enables the collection of keyword data based on transaction completion data; an estimation of conditional probabilities of each keyword translating to an e-commerce transactions; the computation of an expected transaction value generated by each keyword; and the integrate the above metrics with the overall search keyword probabilities. Given a sponsored search budget, and bids on each keyword, the system of the present invention can compute the subset of keywords based on the probabilistic model generated for individual keywords. Finally, the keyword recommendations can be iterated and improved using a feedback adaptation process.

By utilizing search keywords that have resulted in completed transactions, as opposed to searches that did not culminate into transactions, an advertiser is provided with better information to bid on keywords. Furthermore, this order completion information is used to model the probabilities of completed transactions for different keywords, and also expected returns on the keywords. The systems and methods of the present invention also open up many productization opportunities, such as sponsored keyword recommendation based on integrated information across a network. For example, service can be provided to small business merchants as a tool with a monthly fee.

It can therefore be appreciated that the new and novel database search system and method of determining a value of a keyword in a search has been described. It will be appreciated by those skilled in the art that, particular the teaching herein, numerous alternatives and equivalents will be seen to exist which incorporate the disclosed invention. As a result, the invention is not to be limited by the foregoing embodiments, but only by the following claims.

The invention claimed is:

1. A computer-implemented method of determining values of keywords in an internet search comprising:
  receiving keywords entered by at least one user for a plurality of search terms;
  obtaining information about converted transactions associated with a plurality of searches, the plurality of searches having been performed based on the keywords;
  estimating a general transaction probability;
  estimating unigram keyword probabilities;
  determining conditional probability values associated with the keywords based on the converted transactions;
  estimating keyword transaction probabilities based on the general transaction probability, the unigram keyword probabilities, and the conditional probability values; and
  generating expected transaction values based on the keyword transaction probabilities, wherein the expected transaction values are generated according to:

$$E(T\mid k,S) = P(T\mid k,S) * \frac{\sum_{\forall t} R(t\mid k,S)}{C(t\mid k,S)},$$

where C(t|k,S) is a non-zero value.

2. The method of claim 1 further comprising periodically updating the conditional probability values.

3. The method of claim 1 further comprising periodically updating the expected transaction values.

4. The method of claim 1, wherein the expected transaction values comprise average values per order.

5. The method of claim 1 further comprising:
  ranking the keywords based on a conditional transaction completion probability; and
  providing a recommendation of a subset of the keywords to optimize marketing objectives.

6. The method of claim 1 further comprising estimating return on investment (ROI) values for the keywords based on the expected transaction values.

7. The method of claim 6, wherein the ROI values are based on the expected transaction values and an expected number of transactions.

8. The method of claim 6 further comprising:
  determining a maximum entropy based on the ROI values; and
  making recommendations for search terms based on the maximum entropy.

9. The method of claim 6 further comprising ranking the keywords or a subset or subsets of the keywords based on their ROI values.

10. The method of claim 6 further comprising generating a relative ranking of the keywords or a subset or subsets of the keywords based on their relative ROI value to advertisers.

11. A database search system comprising:
  a storage element storing keywords entered by at least one user for a plurality of search terms and information related to converted transactions associated with a plurality of searches, the plurality of searches having been performed on the keywords; and
  a processing system coupled to the storage element, the processing system operative to perform steps comprising:
    estimating a general transaction probability; estimating unigram keyword probabilities;
    determining conditional probability values associated with the keywords based on the converted transactions;
    estimating keyword transaction probabilities based on the general transaction probability, the unigram keyword probabilities, and the conditional probability values; and
    generating expected transaction values based on the keyword transaction probabilities, wherein the expected transaction values are generated according to:

$$E(T\mid k,S) = P(T\mid k,S) * \frac{\sum_{\forall t} R(t\mid k,S)}{C(t\mid k,S)},$$

where C(t|k,S) is a non-zero value.

12. The database search system of claim 11, wherein the processing system is further operative to perform a step of periodically updating the conditional probability values.

13. The database search system of claim 11, wherein the processing system is further operative to perform a step of periodically updating the expected transaction values.

14. The database search system of claim 11, wherein the expected transaction values comprise average values per order.

15. The database search system of claim 11, wherein the processing system is further operative to perform steps of:
  ranking the keywords based upon a conditional transaction completion probability; and
  providing a recommendation of a subset of the keywords to optimize marketing objectives.

16. The database search system of claim 11, wherein the processing system is further operative to perform a step of estimating return on investment (ROI) values for the keywords based on the expected transaction values.

17. The database search system of claim 16, wherein the ROI values are based on the expected transaction values and an expected number of transactions.

18. The database search system of claim 16, wherein the processing system is further operative to perform steps of:
    determining a maximum entropy based on the ROI values; and
    making recommendations for search terms based on the maximum entropy.

19. The database search system of claim 16, wherein the processing system is further operative to perform a step of ranking the keywords or a subset or subsets of the keywords based on the ROI values.

20. The database search system of claim 16, wherein the processing system is further operative to perform a step of generating a relative ranking of the keywords or a subset or subsets of the keywords based on their relative ROI value to advertisers.

21. The database search system of claim 16 further comprising a user interface coupled to the processing system, the user interface enabling advertisers to access a recommendation for selecting at least one keyword.

22. The database search system of claim 21, wherein the recommendations are based on the ROI value for the at least one keyword.

23. A computer-implemented method of recommending search terms based upon converted transactions comprising:
    receiving keywords entered by at least one user for a plurality of search terms;
    obtaining information about converted transactions associated with a plurality of searches, the plurality of searches having been performed based on the keywords;
    estimating a general transaction probability;
    estimating unigram keyword probabilities;
    determining conditional probability values associated with the keywords based upon the information about the converted transactions;
    estimating keyword transaction probabilities based on the general transaction probability, the unigram keyword probabilities, and the conditional probability values;
    generating expected transaction values based on the keyword transaction probabilities, wherein the expected transaction values are generated according to:

$$E(T \mid k, S) = P(T \mid k, S) * \frac{\sum_{\forall t} R(t \mid k, S)}{C(t \mid k, S)},$$

where $C(t|k,S)$ is a non-zero value;
    estimating return on investment (ROI) values for the keywords based on the expected transaction values and an expected number of transactions;
    determining a maximum entropy based on the ROI values;
    making recommendations for search terms based upon the maximum entropy; and
    periodically updating the conditional probability value and the expected transaction value.

* * * * *